(12) United States Patent
Medellin et al.

(10) Patent No.: US 9,732,825 B2
(45) Date of Patent: Aug. 15, 2017

(54) DRIVEN PLATE WITH INTERMEDIATE PLATE CENTERING GUIDE

(71) Applicant: VALEO EMBRAYAGES, Amiens (FR)

(72) Inventors: Alfonso Medellin, Mision de Santiago (MX); Rabah Arhab, Saint-Brice-Sous-Foret (FR)

(73) Assignee: Valeo Embrayages (FR)

( * ) Notice: Subject to any disclaimer, the term of this patent is extended or adjusted under 35 U.S.C. 154(b) by 304 days.

(21) Appl. No.: 14/262,286

(22) Filed: Apr. 25, 2014

(65) Prior Publication Data

US 2015/0308539 A1 Oct. 29, 2015

(51) Int. Cl.
*F16F 15/123* (2006.01)
*F16H 45/02* (2006.01)
*F16F 15/134* (2006.01)

(52) U.S. Cl.
CPC ...... *F16F 15/1343* (2013.01); *F16F 15/1232* (2013.01); *F16F 15/12313* (2013.01); *F16H 45/02* (2013.01); *F16H 2045/0221* (2013.01); *F16H 2045/0226* (2013.01)

(58) Field of Classification Search
CPC ..... F16D 3/12; F16D 3/14; F16D 7/02; F16D 7/025; F16D 2300/22; F16F 15/1232; F16F 15/12323; F16F 15/1343; F16F 15/123; F16F 15/1234; F16F 15/12353; F16F 15/13121; F16F 15/13164; F16F 15/134; F16F 15/13469; F16F 15/13484; F16F 15/137; F16F 15/1421; F16F 15/1428; F16F 15/145; F16F 15/1457; F16H 45/02; F16H 2045/0221; F16H 2045/0226; F16H 2045/0231
USPC .... 464/45, 46, 68.1, 68.4, 68.41, 68.7, 68.8, 464/68.9, 68.92
See application file for complete search history.

(56) References Cited

U.S. PATENT DOCUMENTS

| | | | | |
|---|---|---|---|---|
| 5,105,921 A | * | 4/1992 | Fujimoto | F16H 45/02 464/68.1 |
| 5,941,354 A | * | 8/1999 | Fukushima | F16H 45/02 464/68.1 |
| 6,123,177 A | * | 9/2000 | Arhab | F16H 41/24 192/3.29 |
| 6,571,929 B2 | * | 6/2003 | Tomiyama | F16H 45/02 192/213.1 |
| 8,597,130 B2 | * | 12/2013 | Kombowski | F16F 15/12366 464/68.8 |

(Continued)

FOREIGN PATENT DOCUMENTS

| | | |
|---|---|---|
| DE | 102012113181 | 4/2014 |
| FR | 2788094 | 7/2000 |

(Continued)

*Primary Examiner* — Josh Skroupa
(74) *Attorney, Agent, or Firm* — Berenato & White, LLC

(57) ABSTRACT

A turbine damper assembly, for a torque converter, includes a driven plate and an intermediate plate. The driven plate engages and drives the intermediate plate through elastic drive elements. The driven plate includes an axially extended, circumferentially oriented, driven plate flange that both centers the intermediate plate with respect to the drive plate and also assists in containing the elastic drive elements in circumferential curved cavities during and after assembly of the turbine damper assembly.

14 Claims, 2 Drawing Sheets

(56) References Cited

U.S. PATENT DOCUMENTS

Figure 1:
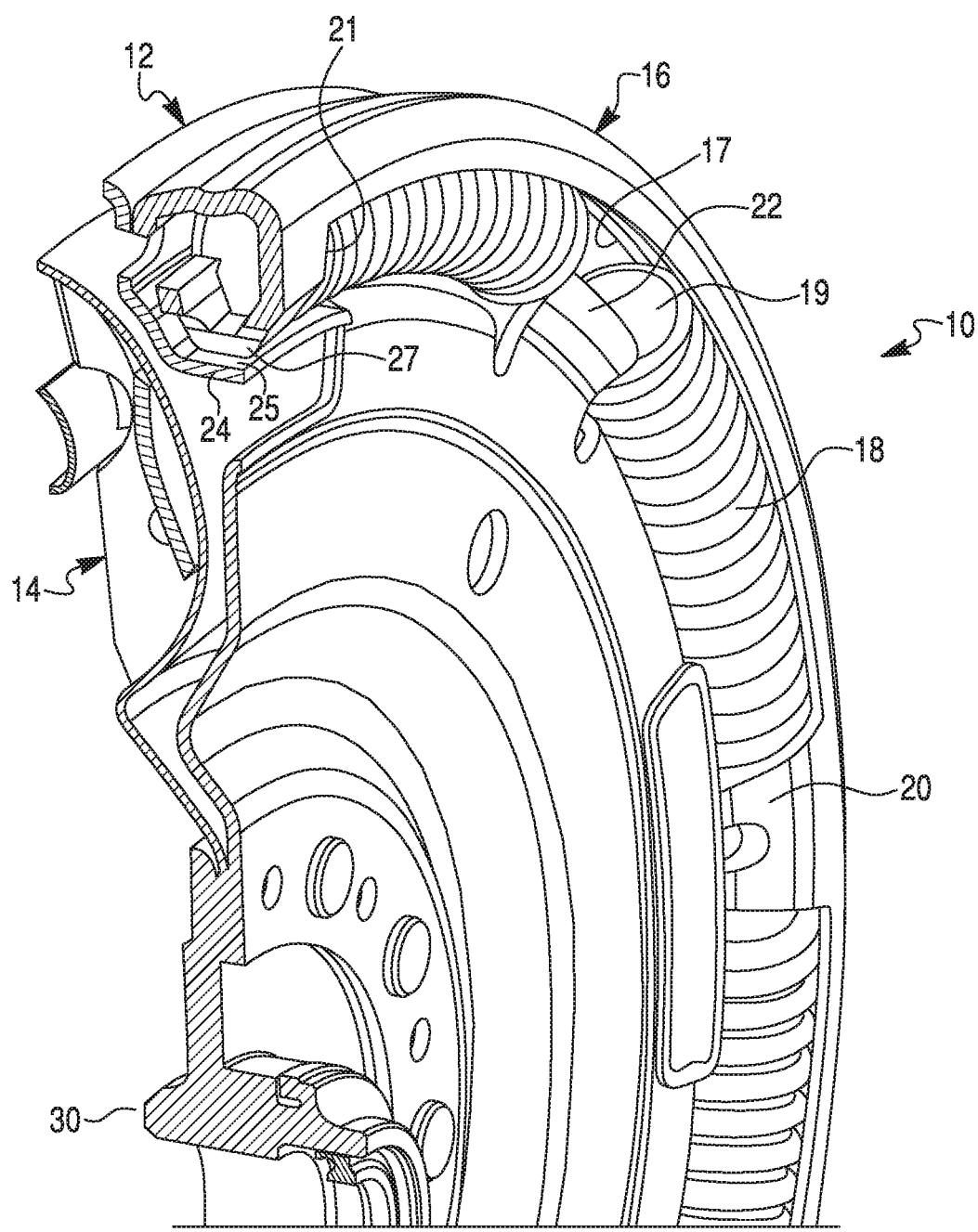

| | | | |
|---|---|---|---|
| 8,771,088 B2 * | 7/2014 | Takikawa | F16H 45/02 464/68.8 |
| 9,011,257 B2 * | 4/2015 | Kawahara | F16F 15/12366 464/68.8 |
| 2001/0052443 A1 | 12/2001 | Tomiyama et al. | |
| 2012/0292150 A1 | 11/2012 | Tomiyama | |
| 2014/0097056 A1 | 4/2014 | Son et al. | |

FOREIGN PATENT DOCUMENTS

| | | | | |
|---|---|---|---|---|
| JP | 2002089658 A | * | 3/2002 | F16H 45/02 |
| WO | WO 2012063586 A1 | * | 5/2012 | F16F 15/12366 |

* cited by examiner

DRIVEN PLATE WITH INTERMEDIATE PLATE CENTERING GUIDE

FIELD OF THE INVENTION

The invention generally relates to a turbine damper assembly of a torque converter. Specifically, this invention relates to a turbine damper assembly of a torque converter turbine comprising a driven plate including an axially and circumferential driven plate flange that ensures intermediate plate to driven plate centering and also helps contain elastic drive elements.

BACKGROUND OF THE INVENTION

In the evolution of automobiles from motorized carriages to highly regulated devices for mass transportation, there has been a continuous pursuit of refinement of the basic combination of elements that comprise the automobile. One aspect of this refinement has been the transmission of torque from an internal combustion engine to a drive system of the automobile. This transmission of torque has, throughout, been accomplished by various gear or chain driven transmission systems alternatively drivingly connected to, or disconnected from a source of motive power, such as the internal combustion engine. The connection/disconnection feature of the drive system is accomplished by means of a clutch. Since the mid-1950's, especially in the United States, this clutch has been a fluid clutch or a torque converter. Owing to the inclusion of this fluid torque transmitting coupling, enhanced refinement of the driving experience was obtained, but this refinement came at the expense of lost efficiency. To address this lost efficiency, the torque converter has become, itself, an object of greater refinement and recaptured efficiency. Often times, a contemporary torque converter includes a friction clutch assembly associated with a driven member of the torque converter which, at preset loads and speeds, eliminates the fluid transmission of torque and replaces the fluid coupling with a direct mechanical friction coupling. This feature is commonly referred to as a lock-up clutch.

In the current lock-up clutch equipped torque converter, efficiency has been recaptured, but a loss of refinement has also occurred when the clutch is in lock-up mode and when it is transitioning into and out of lock-up mode. This is especially true when lock-up clutch elements become worn and tolerances between various rotating and fixed elements increase/decrease in accord with their respective wear patterns. To alleviate some of the mechanical coarseness created by the incorporation of lock-up clutches onto torque converters, the clutch systems, themselves, have increased in complexity. For example, the inclusion of a driven intermediate plate, and the further inclusion of elastic damping members to keep driveline torque oscillations within acceptable parameters, adds rotational mass and complexity to the torque converter sub-assemblies. This added complexity creates the potential for a loss refinement through vibration caused, in part, by unbalanced de-centered rotation of the various components. In addition, it is common for the elastic torque transmitting member equipped devices to, over time and wear, develop rattles and other noises that create a perception of low integrity of the torque converter device. In addition, the assembly of these increasingly complex clutch and damper systems requires more time, patience, and precision. An example of such a torque converter with a lock-up clutch and elastic torque transmission element through an intermediate plate is shown in U.S. Pat. 6,571,929.

Therefore, the torque converters are susceptible to improvements that may enhance their performance, refinement and cost. With this in mind, a need exists to develop an improved turbine damper assembly for a torque converter with improved performance and refinement.

BRIEF SUMMARY OF THE INVENTION

The present invention is a turbine damper assembly comprising a torque converter turbine associated driven plate that includes a shaped, axially extending, driven plate flange that functions as a guide and centering element for an associated driven intermediate plate. In addition, during and after assembly of the driven plate and intermediate plate, the driven plate flange helps contain the elastic torque transmitting drive elements in position in the turbine damper assembly. This containment feature eases assembly and reduces the onset of rattles between the components following wear and sudden torque transitions.

The turbine damper assembly according with an exemplary embodiment of the present invention includes a driven plate non-rotatably attached on a surface opposed to a turbine portion of the torque converter. The driven plate, in turn, rotationally engages the overlying and surrounding intermediate plate through the elastic drive elements. The driven plate includes an axially extended, circumferentially oriented, driven plate flange that is, preferably, stamped into the driven plate. The intermediate plate is driven via radially extending driven plate tabs associated with the driven plate, as these tabs push against the elastic spring elements in a circumferential rotational direction against complementary torque receiving intermediate plate tabs on the intermediate plate. The torque receiving tabs on the intermediate plate overlie the driven plate flange profile so as to center the respective driven and intermediate plates one with respect to the other. In such a structure, once the torque converter is placed in a lock-up mode, the torque path of the drive system is through the elastic drive elements of the intermediate plate.

Also, in accordance with the exemplary embodiment of the present invention, the driven plate flange stamped into the driven plate preferably supports the elastic torque transmitting drive elements as they rest in cooperating aligned windows, stamped into the driven plate, and a circumferential inwardly directed tab equipped groove in the intermediate plate. As the elastic drive elements compress and decompress at various levels of torque transmission, they are suspended against axial and radial movement in a series of circumferential curved cavities which include the driven plate flange and the intermediate plate groove forming at least a portion of the circumferential curved cavity.

BRIEF DESCRIPTION OF THE SEVERAL VIEWS OF THE DRAWING(S)

Figure 2:
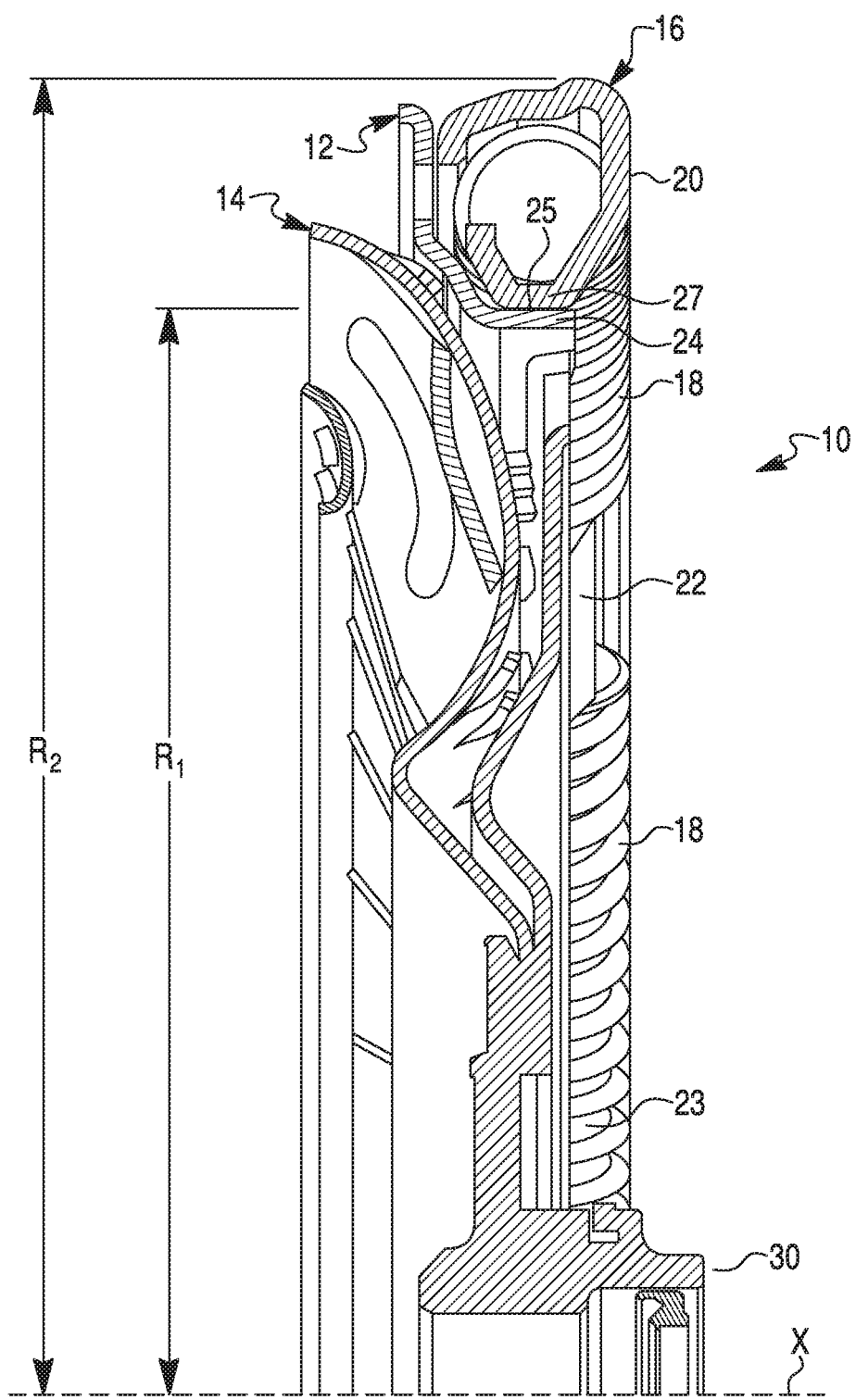

The accompanying drawings are incorporated in and constitute a part of the specification. The drawings, together with the general description given above and the detailed description of the exemplary embodiments and methods given below, serve to explain the principles of the invention. In such drawings:

FIG. 1 is a partial perspective view of a turbine driven plate and associated overlying intermediate plate of a turbine damper assembly in accordance with an exemplary embodiment of the present invention; and FIG. 2 is a sectional view of the turbine damper assembly in accordance with the exemplary embodiment of the present invention.

DETAILED DESCRIPTION OF EXEMPLARY EMBODIMENTS AND EMBODIED METHODS OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a. relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

FIG. 1 shows a turbine damper assembly 10 of a torque converter including a turbine 14 rotatable about a rotational axis X shown in FIG. 2. The turbine damper assembly 10 comprises a substantially annular turbine driven plate 12 and a substantially annular intermediate plate 16, wherein the turbine driven plate 12 is provided with a driven plate flange 24 extending circumferentially and axially away from the turbine 14 in accordance with the present invention. The turbine 14 and the associated driven plate 12 rotate as an integral unit about a turbine hub 30. In other words, both the turbine driven plate 12 and the turbine 14 are non-rotatably secured to the turbine hub 30. It should be understood that the turbine driven plate 12, the turbine 14 and the turbine hub 30 may be non-rotatably secured to one another using any appropriate technique, such as, for example, welding or fasteners, such as rivets.

The turbine driven plate 12 includes radially outwardly extending driven plate (or first) tabs 22 that rotationally urge springs seats 19 against elastic drive elements (springs) 18 that, in turn, urge against radially inwardly directed, torque receiving intermediate plate (or second) tabs 20, so as to rotate the intermediate plate 16. The intermediate plate 16 is, for example, then associated rotationally with a friction clutch element (not shown) for transmitting torque thereafter through an associated vehicle drive system.

The intermediate plate 16 further includes a radially inwardly directed circumferential (or annular) groove 17 that also includes the intermediate plate tabs 20. The intermediate plate tabs 20 overlie and rest on (i.e., is in direct contact with) the driven plate flange 24 when the intermediate plate 16 and the driven plate 12 are assembled as shown. The driven plate flange 24/the intermediate plate tab 20 interface serves to center the intermediate plate 16 with respect to the driven plate 12. The elastic drive elements 18 are contained within windows 21 stamped into the driven plate 12 that cooperate with the complementary intermediate plate tab 20 locations on the overlying intermediate plate 16. Radially inward portions of the elastic drive elements 18 are contained in part, by the driven plate flange 24. This containment via the driven plate flange 24 eases assembly of the intermediate plate 16 and the driven plate 12, and also lessens the development of rattles as the assembled clearances of the turbine damper assembly 10 alter with wear. The elastic drive elements 18 remain confined with a series of circumferential curved cavities 23 defined, respectively, between the radially inwardly directed groove 17 of the intermediate plate 16, and the axial and circumferential driven plate flange 24 of the driven plate 12, and respective drive tabs 22 and 20, and spring seats 19.

FIG. 2 shows a sectional view of the turbine damper assembly 10 shown in FIG. 1. The intermediate plate 16 overlies and is centered with respect to the driven plate 12 via cooperating direct sliding contact between the torque receiving intermediate plate tab 20 and the driven plate flange 24. An external (or first) radius R1 of the driven plate flange 24 is shown to be smaller than an outer (for second) radius R2 of the intermediate plate 16 and an inner surface of the associated intermediate plate tab 20. Preferably, the intermediate plate tab 20 has a reversed U-shape profile, wherein a radially inward (or bottom) portion 27 of the U-shaped intermediate plate tab 20 rests along (i.e., is in direct contact with) a radially outer surface 25 of the driven plate flange 24. Thus, when assembled and, thereafter, in use, the intermediate plate 16 and the driven plate 12 remain respectively centered and the elastic drive elements 18 remain confined in their locations.

The respective driven plate 12 and intermediate plate 16, along with their associated tabs 22 and 20, are stamped from suitable steel or other resilient metal useful for forming torque converter and drive system elements. The elastic drive elements 18 are preferably wound steel springs with sufficient capacity to transfer the torque for which the overall system is designed to transmit.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A torque converter turbine damper assembly rotatable about a rotational axis, comprising:
    a turbine mounted driven plate including a driven plate flange extending circumferentially and axially, the driven plate flange having a first external radius, and torque transmitting, driven plate tabs radially extending beyond said first external radius;
    an intermediate plate including a radially inwardly directed annular groove formed around a circumference of said intermediate plate, said intermediate plate having a second external radius exceeding said first external radius, said groove further including radially inwardly directed torque receiving intermediate plate tabs; and
    elastic drive elements interposed rotationally between said driven plate and said intermediate plate, and residing in a series of circumferential cavities defined, in part, by said driven plate flange and said inwardly directed groove, respectively;
    said driven plate tabs, provided on said drive plate, drive said intermediate plate tabs, provided on said intermediate plate, through said interposed elastic drive elements, and said intermediate plate tabs radially overlie said driven plate flange and rotationally center said intermediate plate with respect to said driven plate.

2. The turbine damper assembly as in claim 1, wherein each of said driven plate and said intermediate plate comprises a stamped metallic construction.

3. The turbine damper assembly, as in claim 1, wherein each of said intermediate plate tabs has a radially inwardly directed U-shaped profile; and wherein a radially inward portion of said U-shaped profile slidingly contacts said driven plate flange.

4. The turbine damper assembly, as in claim 1, wherein said elastic drive elements comprise wound springs.

5. The torque converter turbine damper assembly as in claim 1, wherein said driven plate flange extends axially only in the direction of said rotational axis.

6. A turbine damper assembly rotatable about a rotational axis, comprising:
    a stamped, turbine mounted driven plate including a stamped driven plate flange extending circumferentially and axially, the driven plate flange having a first external radius, and torque transmitting, stamped driven plate tabs radially extending beyond said first external radius;
    a stamped intermediate plate including a radially inwardly directed annular groove formed around a circumference of said intermediate plate, said intermediate plate having a second external radius exceeding said first external radius, said groove further including radially inwardly directed torque receiving U-shaped intermediate plate tabs; and
    elastic drive elements interposed rotationally between said driven plate and said intermediate plate and residing in a series of circumferential cavities defined, in part, by said driven plate flange and said inwardly directed groove, respectively;
    said driven plate tabs, formed on said driven plate, drive said intermediate plate tabs, formed on said intermediate plate, through spring seats associated with each of said interposed elastic drive elements, and said U-shaped intermediate plate tabs radially overlie said driven plate flange and rotationally center said intermediate plate with respect to said driven plate.

7. The turbine damper assembly, as in claim 6, wherein said elastic drive elements comprise wound springs.

8. The turbine assembly, as in claim 6, wherein said U-shaped intermediate plate tabs slidingly contact said driven plate flange along radially inward portions of said U-shaped intermediate plate tabs.

9. The turbine damper assembly as in claim 6, wherein each of said driven plate and said intermediate plate comprises a stamped metallic construction.

10. The turbine damper assembly, as in claim 6, wherein said driven plate flange extends axially only in the direction of said rotational axis.

11. A turbine damper assembly rotatable about a rotational axis, comprising:
    a substantially annular turbine mounted driven plate including a circumferentially and axially extended driven plate flange having a first external radius, and torque transmitting driven plate tabs radially extending beyond said first external radius;
    a substantially annular intermediate plate including a radially inwardly directed annular groove formed around a circumference of said intermediate plate, said intermediate plate having a second external radius exceeding said first external radius, said groove further including radially inwardly directed torque receiving intermediate plate tabs; and
    wound spring elastic drive elements interposed rotationally between said driven plate and said intermediate plate, and residing in a series of circumferential cavities defined, in part, by said driven plate flange and said inwardly directed groove, respectively;
    said driven plate tabs, provided on said drive plate, drive said intermediate plate tabs, provided on said intermediate plate, through said interposed wound spring elastic drive elements, and said intermediate plate tabs radially overlie said driven plate flange and rotationally center said intermediate plate with respect to said driven plate.

12. The damper assembly, as in claim 11, wherein said intermediate plate tabs have U-shaped profiles; and wherein radially inward portions of said U-shaped profiles slidingly contact said driven plate flange.

13. The turbine damper assembly as in claim 11, wherein each of said driven plate and said intermediate plate comprises a stamped metallic construction.

14. The turbine damper assembly, as in claim 11, wherein said driven plate flange extends axially only in the direction of said rotational axis.

* * * * *